United States Patent
Betto et al.

[11] Patent Number: 5,497,953
[45] Date of Patent: Mar. 12, 1996

[54] DEEP-SEA FISHING REEL WITH FRICTION UNWINDING DEVICE

[76] Inventors: Massimo Betto; Stefano Betto; Pietro Betto, all of 20 Viaumbria, Monselice, Italy, 35043

[21] Appl. No.: 198,707

[22] Filed: Feb. 18, 1994

[30] Foreign Application Priority Data

Feb. 19, 1993 [IT] Italy .................... PD93A0037

[51] Int. Cl.⁶ ............................... A01K 89/033
[52] U.S. Cl. ............................... 242/270
[58] Field of Search ............... 242/269, 270, 242/271

[56] References Cited

U.S. PATENT DOCUMENTS

| | | | |
|---|---|---|---|
| 2,067,067 | 1/1937 | Shakespeare, Jr. | 242/270 X |
| 3,993,267 | 11/1976 | Murvall | 242/270 |
| 4,131,245 | 12/1978 | Node | 242/270 |
| 4,422,600 | 12/1983 | Preston | 242/271 |
| 4,516,741 | 5/1985 | Hashimoto | 242/270 |
| 4,651,949 | 3/1987 | Sato | 242/271 |
| 4,742,974 | 5/1988 | Furomoto | 242/271 |
| 4,770,364 | 9/1988 | Sato | 242/270 |
| 4,871,129 | 10/1989 | Hashimoto | 242/271 X |
| 5,318,246 | 6/1994 | Ikuta | 242/271 X |

Primary Examiner—Daniel P. Stodola
Assistant Examiner—William A. Rivera
Attorney, Agent, or Firm—Dowell & Dowell

[57] ABSTRACT

A deep-sea fishing reel includes an adjustable friction system with a pushbutton for self-resetting. The fishing reel is fitted with a non-recovery device of the free wheel type with needlerollers.

20 Claims, 2 Drawing Sheets

10

DEEP-SEA FISHING REEL WITH FRICTION UNWINDING DEVICE

BACKGROUND OF THE INVENTION

Different types of deep-sea fishing reels are known which are fitted with a friction system adjustable by means of a lever and a device for the anti-unwinding of the reel comprised of a toothed device with a holding ratchet. This type of non-recovery system is used by all of the manufacturers producing deep-sea fishing reels and it displays negative aspects such as the recovery of the reel up to the catching point of the non-recovery ratchet, the presence of noise caused by the ratchet disengaging the catching gear and cutting of the ratchet itself, and the presence of a mechanism which besides being bulky can cause breaches or poor functioning of the mechanism itself.

SUMMARY OF THE INVENTION

To solve the above mentioned problems a new fishing reel has been developed, with reduced dimensions and easier maintenance.

The new fishing reel is equipped with a free-wheel device capable of actually eliminating the problems described above giving the new fishing reel safety, reliability and simplicity, as well as a more compact structure that makes it easy to use. The free-wheel is adequately protected by means of gaskets that ensure total resistance against external agents and constant lubrication.

The new fishing reel is also equipped with a special adjusting drag that allows free unwinding of the rolled-up line, the full locking of the line, and the unwinding of the line when the tractive force on the line exceeds a certain level that can be set in advance by knob 44 and adjusted by means of a graduated drag lever 12. By operating this lever, an almost free status of the spool 18 can be obtained and therefore the unwinding of the line wound on it, when the lever 12 is at a full stop position. This condition, described as almost free, allows the spool 18 to be subject to a minimum action of the drag, that is yet sufficient to prevent the jamming of the line wound on the spool in case of rapid outgoing of the line due to a fish biting. There is a maximum braking condition when the drag lever is at the opposite stop position. The line unwinding takes place therefore when the dragging force of the fish exceeds the spool braking determined by the position of the lever along its stroke, from the point of maximum freedom to the point of maximum braking. Along the stroke is a graduated reference scale 42 engraved in the outside flange 46 so that the drag braking never exceeds the resistance capacity of the line and it can therefore be adjusted according to the line strength by operating the pre-setting device; this prevents the line breaking when the drag lever is at the stop position.

The drag lever can reach the extreme positions of full free, at which there is no impediment to the clutch and the spool rotates freely, and fully braked. These two extreme positions are used only under special conditions.

The fishing reel is equipped with a device comprised of a pushbutton 48 that, when operated, allows positioning of the drag lever 12 at the extreme points of stroke. The pushbutton is connected by means of a pin 34 located in a slide notch 36 formed on the flange 46 with a special profile which permits resetting the drag lever operation along the scale.

The slide notch 36 presents a large central section 49, substantially homogeneous, and two end parts 50, 52 and the profile between the central part and both end parts is step-shaped so that the pin 34 can reach the end parts only by the translation due to the pressing of the pushbutton 48.

The device described herein allows a rational and practical choice of the planned operating field, an extreme streamlining of a part of the reel, which has been often displayed poor efficiency, practicality and functioning, and the possibility of setting an anti-jamming condition which is extremely important for the user.

The lever 12 is free to move in the central section 49, thus gradually adjusting the drag strength against consecutive tractive forces, while to reach the positions of total locking or total release, it is necessary to operate the pushbutton 48. To go back to the central section 49 it is sufficient to operate only the lever 12.

The axis of rotation of the main or winding lever 22 is laterally oriented and is fitted with a free motion device with needle-rollers 26 while the main gear 32 is connected to the lever itself.

A register screw allows the regulation of the whole adjustment stroke, thus increasing or reducing the displayed strength range.

Another characteristic of the reel is a new device which transmits the thrust, controlled by the drag lever 12 of the spool 18, against the disc on which a friction material 20 is mounted.

Generally this thrust has been exerted directly on the central toothed spindle, as it is well known that it is difficult to exert the thrust on the spool because of the presence of the gear combination transmitting the motion to the sprocket itself. These difficulties have been solved by means of a new system of translation carried out by three pins 16 which pass over the gears 32, 33, exerting a thrust transmitted on the bushing 54, which in turn transmits thrust on the bearings 56 and then on the spool 18, thus exerting a thrust which is better distributed on three points rather than on only one, and with a considerable reduction of the friction caused by the translation.

DESCRIPTION OF THE PREFERRED EMBODIMENT

The following is a non-restrictive example among many of the practical applications of the present invention.

Figure 1:
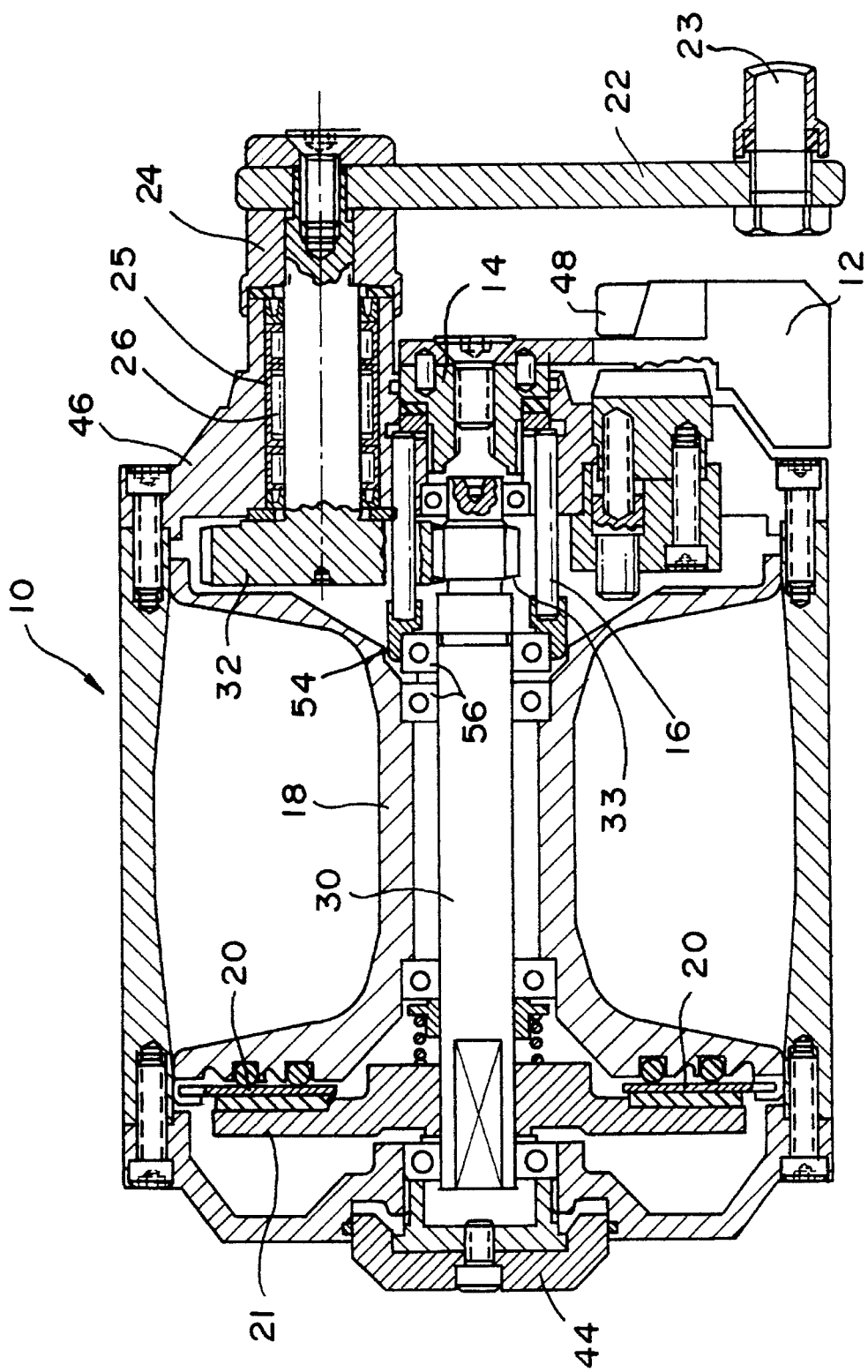
FIG. 1 is cross-sectional view of a fishing reel in accordance with a preferred embodiment of the invention.

FIG. 1 illustrates a cross-sectional view of a fishing reel 10 in accordance with a preferred embodiment of the invention. The fishing reel comprises a drag lever 12, a threaded pivot 14 which transfers and presses on pins 16, which in turn work on a spool 18 fitted with friction material 20 which abuts a face of a member 21 mounted on the shaft 30.

A winding lever 22 having a handle 23 is connected to a pivot 24 placed in a non-central position of the reel and fitted with a non-recovery device of the free-wheel type 25 with needle-rollers 26. An integral gear 32 of the pivot 24 moves a central shaft 30 by means of a gear 33. The central shaft 30 rotates the spool 18 on which the line is wound.

Figure 2:
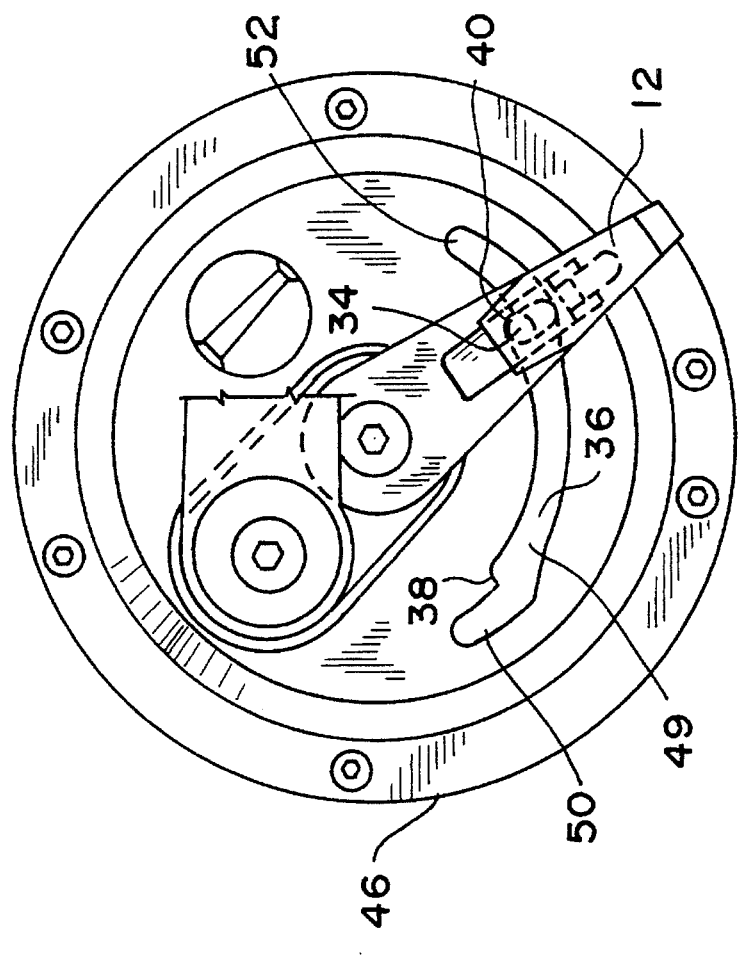
FIG. 2 is a side view of the fishing reel of the present invention.

FIG. 2 shows a side of the fishing reel illustrating the drag lever 12, and the pin 34 inserted into a slide notch 36 fitted with two break-points 38 and 40.

Figure 3:
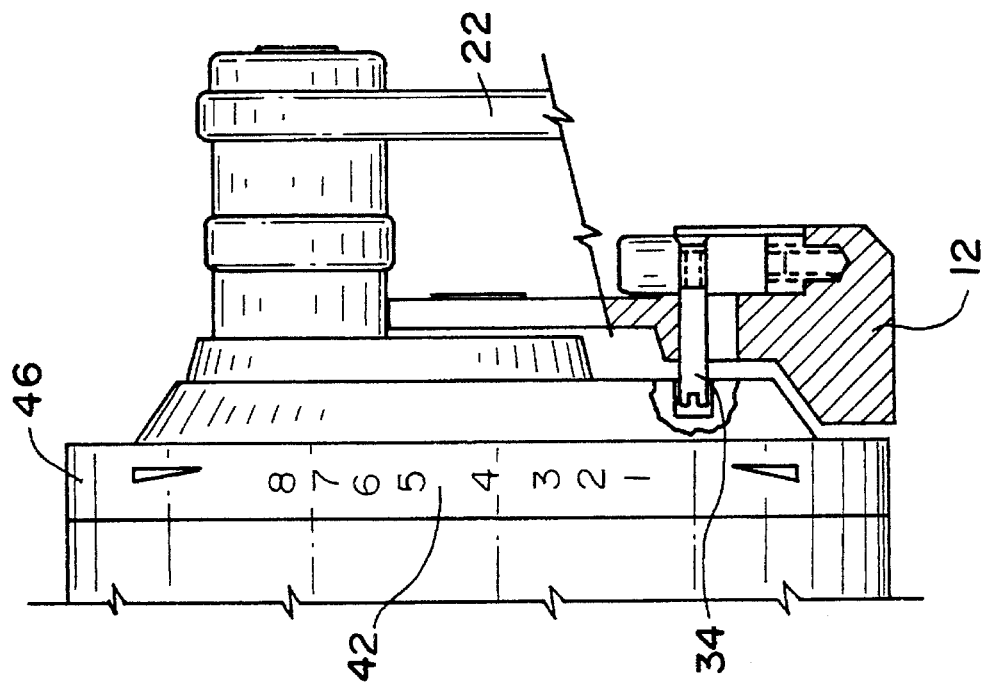
FIG. 3 is a partial cross-sectional view of the fishing reel of the present invention.

FIG. 3 illustrates the drag lever 12, the pin 34, and the graduated reference scale 42.

We claim:

1. A fishing reel comprising:
   a side flange defining an arcuate slot having a central portion and first and second end portions radially offset relative to said central portion;
   a drag lever pivotally mounted to said side flange, and a first pin connected to said drag lever and being slidingly received in said arcuate slot;
   a plurality of second pins connected to said drag lever;
   a winding lever mounted to said side flange and fastened to a first gear;
   a shaft including a second gear engaging said first gear;
   a spool mounted on said shaft and being resiliently urged against said second pins, said spool having friction material disposed on a face thereof;
   a member mounted on said shaft for frictionally engaging said friction material; and
   said spool being selectively movable relative to said shaft by operation of said drag lever, said drag lever having a minimum braking condition in which said first pin is received in said first end portion of said arcuate slot and a minimum braking level is applied to said spool so as to be substantially freely rotatable relative to said shaft, and said drag lever having a maximum braking condition in which said first pin is received in said second end portion of said arcuate slot and a maximum braking level is applied to said spool so as to be substantially simultaneously rotatable relative to said winding lever.

2. The fishing reel of claim 1, wherein said drag lever comprises a release button connected to said first pin, said release button being depressible to enable said first pin to be selectively moved between said central portion and said first and second end portions of said arcuate slot.

3. The fishing reel of claim 1, comprising at least one bearing provided on said shaft, said second pins being received in a bushing disposed in abutting contact with said bearing.

4. The fishing reel of claim 3, comprising three second pins.

5. The fishing reel of claim 1, comprising a spring disposed on said shaft for resiliently urging said spool against said second pins.

6. The fishing reel of claim 1, wherein said first gear comprises an integral shaft portion, and comprising bearings disposed on said shaft portion.

7. The fishing reel of claim 1, comprising an adjustable drag pre-set knob for selectively moving said member into contact with said frictional material so as to apply a pre-set drag level to said spool.

8. The fishing reel of claim 1, wherein said winding lever is mounted to said side flange at an offset position relative to a longitudinal axis of said shaft.

9. The fishing reel of claim 1, comprising a numerical reference scale on said side flange for setting the braking level applied to said spool by operation of said drag lever.

10. The fishing reel of claim 1, wherein said spool is subjected to a sufficient level of braking in said minimum braking condition so as to prevent jamming of line wound on said spool due to a force exceeding said minimum braking level being applied to the line.

11. The fishing reel of claim 10, wherein said spool is subjected to a braking level intermediate said minimum braking level and said maximum braking-level when said first pin is received in said central portion of said arcuate slot.

12. A fishing reel comprising:
    a side flange defining an arcuate slot having a central portion and first and second end portions;
    a drag lever pivotally mounted to said side flange, and a first pin connected to said drag lever and being slidingly received in said arcuate slot;
    a plurality of second pins connected to said drag lever;
    a winding lever mounted to said side flange;
    a shaft rotatably connected to said winding lever;
    a spool mounted on said shaft and being resiliently urged against said second pins, said spool having friction material disposed on a face thereof;
    a member mounted on said shaft for frictionally engaging said friction material; and
    said spool being selectively movable relative to said shaft by operation of said drag lever, said drag lever having a minimum braking condition in which said first pin is received in said first end portion of said arcuate slot and a minimum braking level is applied to said spool so as to be substantially freely rotatable relative to said shaft, said spool being subjected to a sufficient level of braking in said minimum braking condition so as to prevent jamming of line wound on said spool due to a force exceeding said minimum braking level being applied to the line, said drag lever having a maximum braking condition in which said first pin is received in said second end portion of said arcuate slot and a maximum braking level is applied to said spool so as to be substantially simultaneously rotatable relative to said winding lever, and said spool being subjected to a braking level intermediate said minimum braking level and said maximum braking level when said first pin is received in said central portion of said arcuate slot.

13. The fishing reel of claim 12, wherein said drag lever comprises a release button connected to said first pin, said release button being selectively depressible to enable said first pin to be moved from said central portion to said first and second end portions of said arcuate slot to adjust the level of braking applied to said spool.

14. The fishing reel of claim 13, comprising a first gear fastened to said winding lever, and a second gear mounted on said shaft and engaging said first gear.

15. The fishing reel of claim 14, wherein said winding lever is mounted to said side flange at an offset position relative to a longitudinal axis of said shaft.

16. The fishing reel of claim 15, comprising a numerical reference scale formed on said side flange for setting the braking level applied to said spool by operation of said drag lever.

17. The fishing reel of claim 12, comprising at least one bearing provided on said shaft, said second pins being received in a bushing disposed in abutting contact with said bearing.

18. The fishing reel of claim 17, comprising three second pins.

19. The fishing reel of claim 12, comprising a spring disposed on said shaft for resiliently urging said spool against said second pins.

20. The fishing reel of claim 12, comprising an adjustable drag pre-set knob for selectively moving said member into frictional contact with said frictional material.

* * * * *